United States Patent [19]
Lin et al.

[11] Patent Number: 5,659,399
[45] Date of Patent: Aug. 19, 1997

[54] METHOD FOR CONTROLLING COMPACT DOT GROWTH

[75] Inventors: Ying-wei Lin, Penfield; Martin E. Banton, Fairport, both of N.Y.

[73] Assignee: Xerox Corporation, Stamford, Conn.

[21] Appl. No.: 565,138

[22] Filed: Nov. 30, 1995

[51] Int. Cl.$^6$ .............................. G06K 15/00; G06K 1/00
[52] U.S. Cl. ........................... 358/298; 358/456; 382/209
[58] Field of Search ........................ 395/109, 129; 347/131; 382/266, 209, 267, 269, 199, 207; 358/258, 454, 455, 456, 466, 459

[56] References Cited

U.S. PATENT DOCUMENTS

| | | | |
|---|---|---|---|
| 4,544,264 | 10/1985 | Bassetti et al. | 355/14 R |
| 4,847,641 | 7/1989 | Tung | 346/154 |
| 5,029,108 | 7/1991 | Lung | 364/519 |
| 5,047,955 | 9/1991 | Shope et al. | 364/519 |
| 5,408,329 | 4/1995 | Mailloux et al. | 358/298 |

OTHER PUBLICATIONS

*Behind Hewlett–Packard's Patent on Resolution Enhancement Technology;* J. Randolph Sanders et al.; 1990; pp. 1–60.

"A Survey of Electronic Techniques for Pictorial Image Reproduction"; *IEEE Transactions on Communications;* vol. COM-29, No. 12, Dec. 1981.

"Mathematical Morphology in Image Processing"; Edward R. Dougherty; *Rochester Institute of Technology;* 1992; pp. 43–90.

"Advance Printing of Paper Summaries"; *SPSE's 41st Annual Conference;* May 22–26, 1988 pp. 342–347.

*Primary Examiner*—Peter S. Wong
*Assistant Examiner*—Gregory J. Toatley, Jr.
*Attorney, Agent, or Firm*—Duane C. Basch

[57] ABSTRACT

The present invention is a method and apparatus for detecting the presence of image regions requiring compact dot growth control and controlling the dot growth of such regions when rendered on a printing system. The invention operates to recognize those pixels within a bitmap image that are appropriate for alteration, using a template-based approach, and then alters the exposure pulse of identified pixels during imaging so as to assure a more stable output by a xerographic development system.

19 Claims, 4 Drawing Sheets

METHOD FOR CONTROLLING COMPACT DOT GROWTH

This invention relates generally to a method for controlling compact dot growth in a bitmap image rendered by a printing system, and more particularly to a technique for detecting the presence of image regions requiring compact dot growth control, and generating appropriate output signals to accomplish such control in a raster-based printing system.

CROSS REFERENCE

The following related applications are hereby incorporated by reference for their teachings:

"METHOD AND APPARATUS FOR APPEARANCE TUNING OF BITMAP IMAGES," J. Parker, application Ser. No. 08/496,556, filed Jun. 29, 1995;

"APPARATUS AND METHOD FOR ENCODING AND RECONSTRUCTING IMAGE DATA," Thomas L Yeh et al., application Ser. No. 08/315,275, filed Sep. 29, 1994; and "MULTIFUNCTIONAL APPARATUS FOR APPEARANCE TUNING AND RESOLUTION RECONSTRUCTION OF DIGITAL IMAGES," Bonnie R. Coonan et al., application Ser. No. 08/496,654, filed Jun. 29, 1995.

BACKGROUND AND SUMMARY OF THE INVENTION

The present invention is a method and apparatus suitable for implementing improved compact dot growth (CDG) in a printing system. Using the improved compact dot growth method, image data discarded from an input image during an encoding process may be subsequently reconstructed in a manner which serves to replenish a substantial amount of the discarded image data and minimize degradation of an output representation of the image. The general purpose of a compact dot growth operation is to eliminate or reduce as many "gray" exposures as possible in the output image. It is known that "gray" exposures may be produced in a pulse-width position-modulated output device by varying the pulse width and position of the exposure pulse (see e.g., Cianciosi et al., U.S. application Ser. No. 08/118,858, filed Sep. 10, 1993). Ideally, the "gray" exposures are eliminated by shifting the partial pixel pulses to a neighboring black pixel, thereby "growing" or elongating the exposure period of the neighboring pulse. Similarly, adjacent pairs of gray pulses can be merged, producing exposure profiles that result in xerographically better improved stability and/or uniformity on the output print. This process eliminates the "gray" exposures which are shorter and isolated, and which tend to be less stable xerographically than black pulses. While the general process of employing a compact dot growth operation has been described in pending application Ser. Nos. 08/496,556 by Parker and 08/496,654 by Coonan et al., the present invention improves on the described operation by recognizing opportunities to improve xerographic stability when a plurality of "gray" pixel exposures are present adjacent to one another but between either black or white pixels. Moreover, the present method employs only a single dimension template with which it accomplishes recognition of those pixels requiring correction.

It is known that the output of an image can be enhanced significantly through the use of a high addressability output device. For example, by using a printing machine with a capability of storing or buffering scanned data prepared at a resolution of 600×600×3 spots/inch (spi) a corresponding output of 1800×600×1 spi can be obtained. While such high resolution is desirable, storing image data at 600 ×600)<3 spi is burdensome in a printing machine with the limited amount of memory found in many digital printing systems. While various printing systems advantageously exploit disk storage and associated compression schemes (e.g., Xerox DocuTech, and U.S. Pat. No. 5,047,955, to Shope et al. (Issued Sep. 10, 1991) it is, for purposes of outputting a job, necessary to store or buffer the job in system memory; particularly when the job must be precollated. Hence it is desirable to store or buffer a job in system memory of a high addressability printing machine at a first resolution and output it at a second resolution, where the first resolution is significantly less than the second resolution.

For example, as disclosed by Coonan et al. storing or buffering a job at less than 600×600×3 spi is accomplished by discarding image data. Naturally the discarding of image data may lead to a degradation of image quality when reproducing the image data. It is, therefore, also desirable to provide an apparatus that facilitates a technique or process in which at least a part of the discarded image data could be reconstructed, where image degradation is minimized using a compact dot growth process.

Using morphological, template-matching techniques the present invention facilitates the identification of specific pixel structures within a bitmap image. Once identified, the structures may be "tuned" so as to appear in the fashion desired when rendered by a raster output scanner (ROS) or similar image output terminal (IOT).

Heretofore, a number of patents and publications have disclosed template-based filters for image enhancement and resolution conversion, the relevant portions of which may be briefly summarized as follows:

U.S. Pat. No. 4,544,264 and U.S. Pat. No. 4,625,222 to Bassetti et al., disclose enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,847,641 and U.S. Pat. No. 5,005,139 to Tung, teach print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,408,329 to Mailloux et al., discloses the use of digital darkness control or pixel stretch techniques in electronic imaging devices regardless of differences in development systems (e.g., write-white or write-black). The inventors note that it is important to match images or have images look alike regardless of the particular system in a given machine that is used in developing the image. Accordingly, the invention provides an electronic adjustment to an original image in order to compensate for various development systems as well as to compensate for quality settings within a given development system. Employed are sets of decoding rules applicable to 2×2 or 3×3 arrays of image pixels to accomplish darkness adjustment for a given pixel matrix.

U.S. patent application Ser. No. 07/513,415, and the corresponding Japanese laid-open patent publication 4-227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of patents and publications are summarized in Torrey Pines Research, Behind Hewlett-Packard's Patent on Resolution Enhancement™ Technology, (Becky Colgan ed., BIS CAP International, 1990) pp. 1–60, including concepts associated with resolution enhancement.

James C. Stoffel et al. in A Survey of Electronic Techniques for Pictorial Image Reproduction, IEEE Transactions on Communications, Vol. COM-29, No. 12, December 1981 discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

Mathematical Morphology in Image Processing, pp. 43–90 (Edward R. Dougherty ed., Marcel Dekker 1992) describes efficient design strategies for the optimal binary digital morphological filter. A suboptimal design methodology is investigated for binary filters in order to facilitate a computationally manageable design process.

M. Anzai et al. in "A New High-Resolution Halftone Printing Method For an Electrophotographic Laser Printer," Society for Imaging Science and Technology—41st Annual Conference, Arlington, Va., May 1988, pp. 343–346, teach the difficulty in accomplishing halftone rendering with pulse width modulated laser light. Proposed is a neighboring dot connection method wherein dots of neighboring picture elements are joined to keep the dot information in the picture elements.

In accordance with the present invention, there is provided a compact dot growth method for selectively controlling the exposure of a xerographic printing system capable of producing printed output from a print engine in response to a digital image, consisting of a plurality of digital image signals each digital image signal indicating one of a plurality gray exposure levels as a multi-bit value, comprising the steps of: storing, in memory, a one-dimensional segment of the digital image signals forming the digital image; identifying, using a template matching operation applied to the stored digital image signals, a multi-bit value associated with a pixel position to be selectively controlled; for the pixel position identified to be selectively controlled, producing a pixel code representative of an exposure duration and position shift to be applied to the pixel position to be selectively controlled, and directing the print engine to shift the exposure position in response to the pixel code.

In accordance with another aspect of the present invention, there is provided an image processing apparatus for processing a bitmap image consisting of a plurality of input image signals representing a bitmap image, comprising: a one-dimensional context memory for storing a plurality of multi-bit image signals from a single raster of the bitmap; a template matching circuit for comparing the multi-bit image signals stored in said one-dimensional context memory with a plurality of templates, said template matching circuit outputting a signal indicating a match between the stored image signals and a template; and a pixel code generator, responsive to said template matching circuit, for generating a pixel code in response to the signal indicating a match between the stored multi-bit image signals and the template, said pixel code indicating the exposure duration and shifted location within a pixel period for a target pixel within the context memory.

In accordance with yet another aspect of the present invention, there is provided a printing system for processing a bitmap image consisting of a plurality of gray input image signals at a first resolution to be represented as a binary bitmap image at a resolution greater than the first resolution, comprising: a one-dimensional memory buffer for storing a portion of a single raster of the gray image signals at the first resolution; pattern matching logic circuitry for identifying, within the stored gray image signals at the first resolution, a target pixel requiring modification prior to exposure of a binary pixel at a second resolution greater than the first resolution, said pattern matching logic circuitry producing a signal whenever the target pixel requiring modification is identified; and a programmable device, responsive to the signal generated by the pattern matching logic circuitry and the target pixel image signal, for producing an output signal for driving the printing system, the output signal resulting in the production, by the printing system, of a binary exposure pulse shifted within a pixel period defined by the first resolution.

One aspect of the invention is based on the observation of problems with conventional printing systems. Such systems, although they may be capable of rendering images received in a page description language (PDL) such as Interpress (Xerox Corp.) or Postscript (Adobe Corp.), typically render the image in accordance with the appearance determined as a result of the particular marking engine employed. However, such systems may result in user dissatisfaction because of an expectation of the appearance, based in part upon the WYSIWYG document preparation software and/or prior prints produced on other printers (e.g., dedicated workstation or desktop printers).

This aspect is based on the discovery of a technique that improves the stability of xerographically generated output. This technique can be implemented, for example, by circuitry that is also employed to accomplish compact dot growth after resolution reconstruction of an encoded image. The present invention finds particular use for complementing other compact dot growth techniques so as to assure xerographic stability and improve the uniformity of an output print. The compact dot growth circuitry of the present invention is also simplified, relying solely on a one-dimensional "window" of pixels surrounding a pixel of interest. Thus, only a partial raster of image data need be buffered to implement the techniques of the present invention. A machine implementing the invention can include a laser-based electronic printing system, wherein the laser beam intensity or exposure level may be modified via pulse width position modulation (PWPM) in response to the signals representing the tuned or reconstructed image.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An N-bit item of data has one of $2^N$ values. A "multi-bit" item of data is an item of data or signal that includes more than one bits.

The term "data" includes data existing in any physical form, and includes data that are transitory or are being stored or transmitted. For example, data could exist as electromagnetic or other transmitted signals or as signals stored in electronic, magnetic, or other form.

An item of data "defines" an image when the item of data includes sufficient information to produce the image. For example, a two-dimensional array can define all or any part of an image, with each item of data in the array providing a value indicating the color of a respective location of the image. A "raster" is a one-dimensional array of image data, reflecting a single line of data across a single dimension (length or width) of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image. An operation performs "image processing" when it operates on an item of data that relates to part of an image.

A "neighborhood operation" is an image processing operation that uses data relating to one part of an image to obtain data relating to another part of an image. Pixels are "neighbors" or "neighboring" within an image when there are no other pixels between them and they meet an appropriate criterion for neighboring. For example, the criterion used in the present invention identifies a neighborhood of five linearly adjacent pixels (two on each side of a target pixel along an image raster).

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Circuitry" or a "circuit" is any physical arrangement of matter that can respond to a first signal at one location or time by providing a second signal at another location or time. Circuitry specifically includes logic circuits existing as interconnected components, programmable logic arrays (PEAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium devices with data storage media that they can access. A "memory cell" is memory circuitry that can store a single unit of data, such as a bit or other n-ary digit or an analog value.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

An "image input terminal" (IIT) or "image input device" is a device that can receive an image and provide an item of data defining a version of the image. A "scanner" is an image input device that receives an image by a scanning operation, such as by scanning a document.

An "image output terminal" (IOT) or "image output device" is a device (e.g., a raster output scanner) that can receive an item of data defining an image and provide the image as output. A "display" is an image output device that provides the output image in human viewable form. The visible pattern presented by a display is a "displayed image" or simply "image." Printers or printing systems are other examples of image output terminals.

Figure 1:
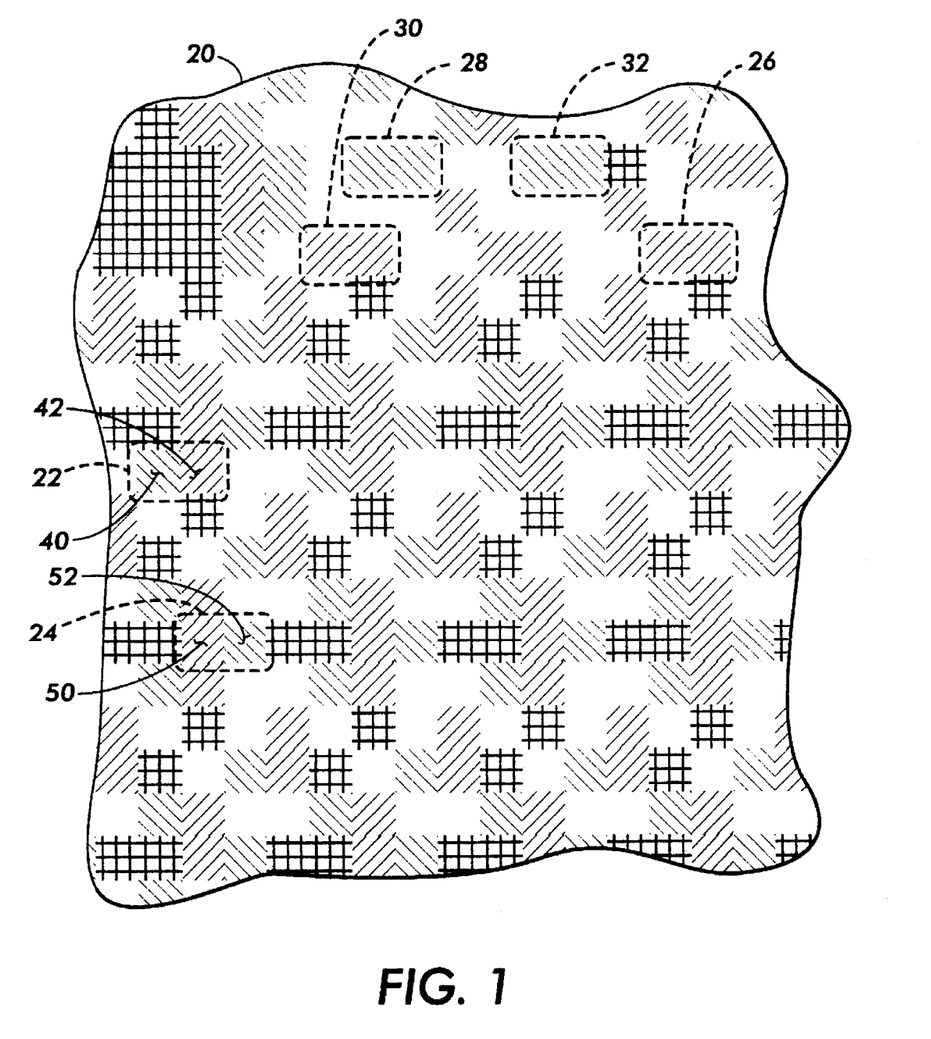
FIG. 1 is an enlarged representation of a segment of a bitmap image.

Referring first to FIG. 1, displayed therein is a highly magnified segment of an image to be printed or displayed on an image output device. In particular, FIG. 1 illustrates image segment 20, wherein the image segment is a 600×600 spot per inch (spi) representation of a portion of an exemplary gray scale image represented by at least 2-bits per pixel. Various portions of image segment 20 are intended to represent an enlarged halftone region, where a repetitive pattern of the four possible gray levels is seen in certain regions. It is just such regions to which the present invention is directed. For example, region 22 is a region where a first gray level (61) pixel is adjacent a second gray level (G2) pixel, both of which are located between a black and a white pixel. Similarly, regions 24, 26, 28 30 and 32 reflect other possible pairings of gray level pixels in the image segment. Some of these pairings, and associated pixels surrounding them are the focus of the improved method for compact dot growth described herein to improve the stability of the image when printed, or more specifically, when developed xerographically.

Figure 2A:
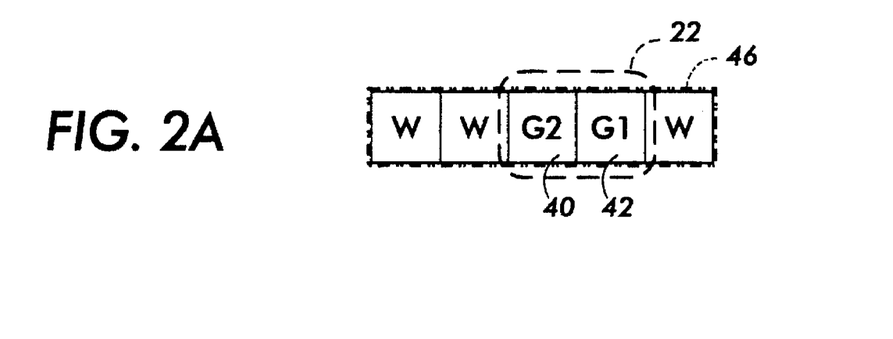
FIGS. 2A–2B and 3A–3B are illustrative examples of operations performed, on pixels of interest from FIG. 1, in accordance with the present invention.
Figure 2B:
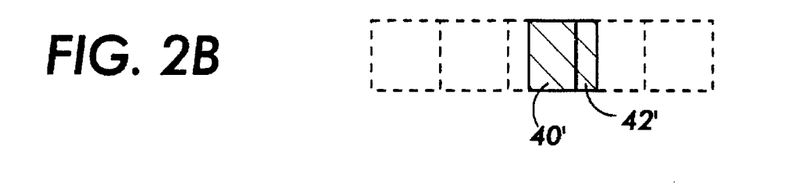

FIGS. 2A and 2B, for example, illustrate the operation that would preferably be employed to render pixel region 22 of FIG. 1 in a horizontally shifted fashion so as to cause pixels 40 and 42 to appear as pixels 40' and 42'. In other words pixels 40 and 42 are shifted toward one another to result in a more stable exposure pulse. As shown in FIG. 2A, target pixel 40 is first identified by a context sensitive, preferably five pixel wide, horizontal window 46, although not specifically limited thereto. Target pixel 40 appears at the center of a neighborhood of pixels that define the context window. Whenever the pattern of context window 46 is identified within the bitmap, the printing system will automatically determine what, if any, processing must be accomplished to provide the compact dot growth adjustment to produce the desired exposure pulses for the output print. In the example region 22, the exposure pulse for pixel 40 is shifted to the right (pixel 40') and during subsequent processing of pixel 42, its exposure pulse will be shifted to the left side of the pixel period (42').

Figure 3A:
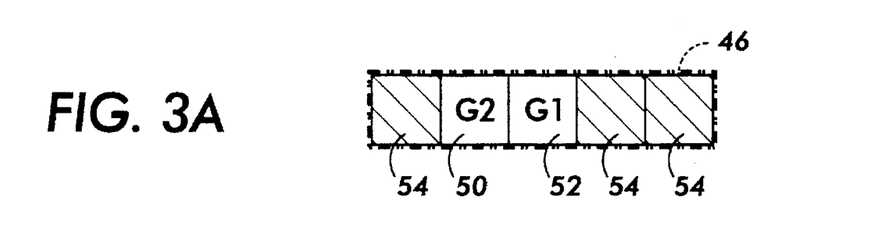
Figure 3B:
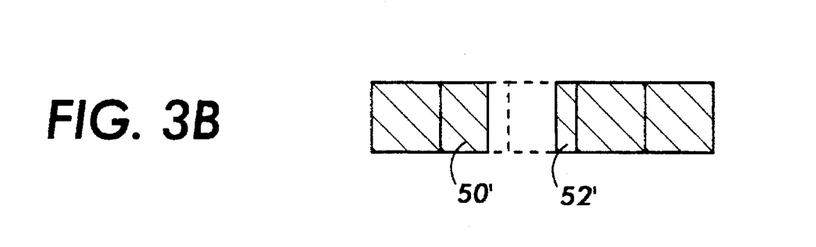

FIGS. 3A and 3B illustrate a second example associated with region 24 of FIG. 1. In particular, the pixel pair G2-G1, pixels 50 and 52 respectively, are located between surrounding black pixels 54. As before, FIG. 3B illustrates the operation employed to render pixel region 24 of FIG. 1 in a horizontally shifted fashion, so as to cause pixels 50 and 52 to appear as pixels 50' and 52' in FIG. 3B. In other words, pixels 50 and 52 are shifted away from one another to effectively extend or lengthen the black pixel exposure pulses on either side of the pixel pair. As shown in FIG. 3A, target pixel 50 is identified by the five pixel wide, horizontal window 46. The target pixel 50 appears at the center of a neighborhood of pixels that define the context window. Whenever the pattern existing within context window 46 is identified within the image bitmap, the printing system embodying the present invention will automatically determine that the exposure pulse for pixel 50 is to be shifted leftward, as represented by pixel 50' in FIG. 3B. And in processing the next pixel position, when pixel 52 is the pixel of interest at the center of window 46, the exposure pulse will be shifted rightward, as illustrated by pixel 52' in FIG. 3B.

In a preferred embodiment, the present invention is applied in conjunction with one or more additional sets of templates, for example, those taught by Parker (application Ser. No. 08/496,556) or Coonan et al. (application Ser. No. 08/496,654). Having generally described the improved compact dot growth method of the present invention, the following description will further describe an exemplary embodiment for implementation of the present invention. The embodiment is directed to multiple bit per pixel compact dot growth and will be described with respect to a preferred apparatus therefor. The embodiment will be described with respect to a printing system suitable for receiving raster-based input from any number of image input terminals including, but not limited to, a computer workstation or an electronic subsystem (ESS) which receives image data from a network or other image source. The ESS may further process the image using well-known image processing operations implemented therein, prior to passing the rasterized bitmap data to the printing system employing the present invention.

Figure 4:
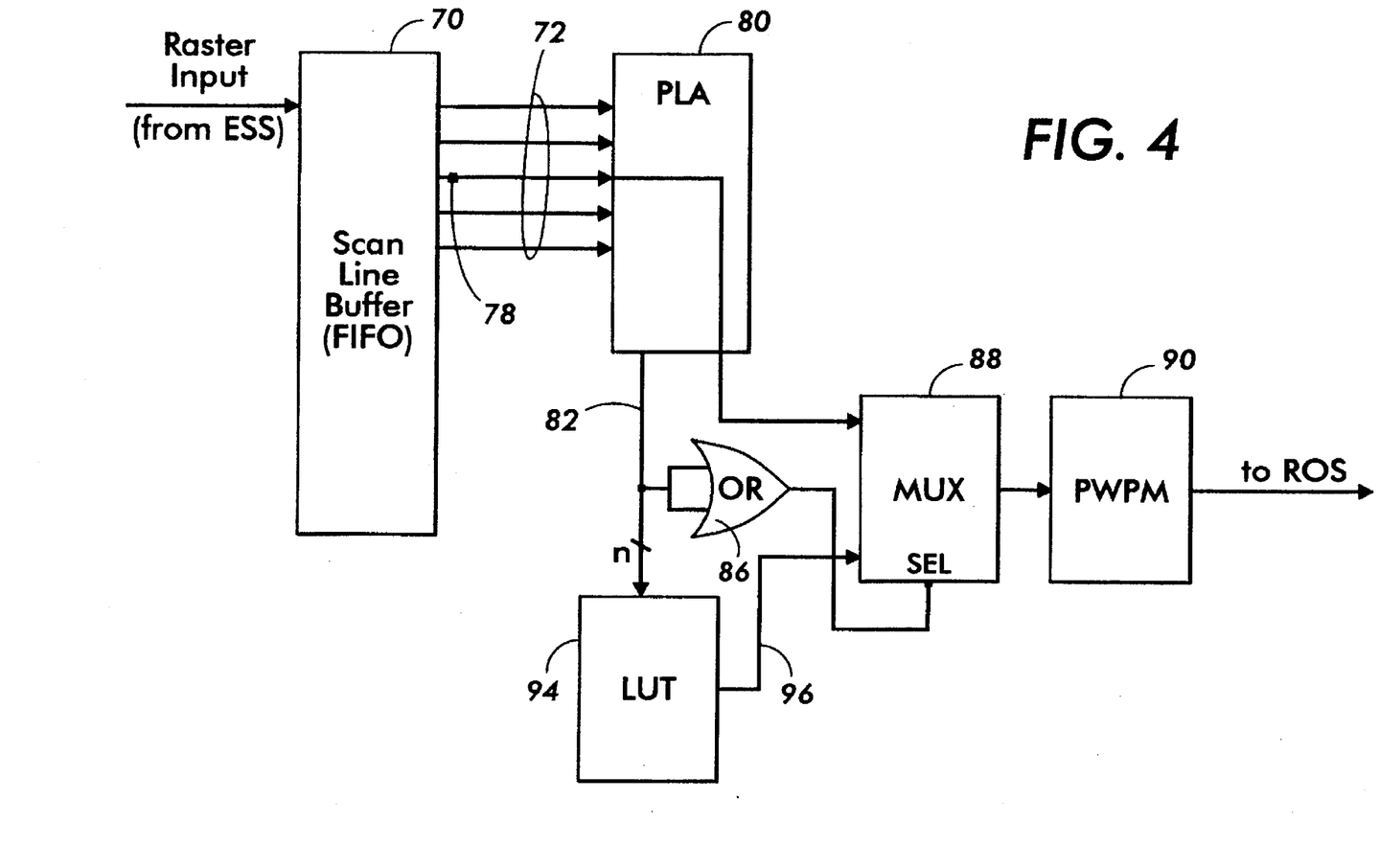
FIG. 4 is a schematic block diagram of a binary embodiment of a hardware system implementing the present invention.
Figure 6:
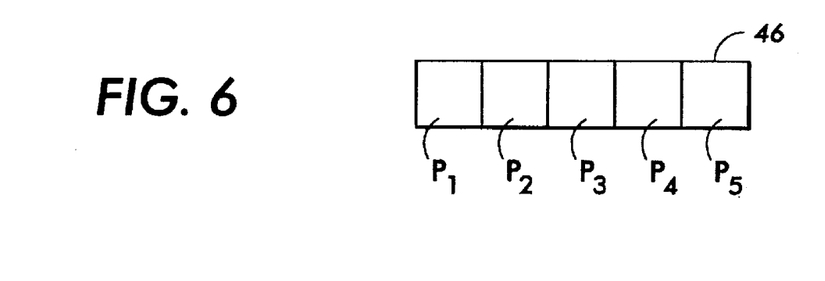
FIG. 6 is an illustration of a 1×5 context window employed in accordance with the present invention.

Referring to FIG. 4, which schematically illustrates a simplified embodiment of the present invention, the processing apparatus is designed to receive rasters of image data from an electronic subsystem (ESS) and to store the data, sequentially in a scan line buffer 70 in first-in, first-out (FIFO) format. Scan line buffer 70 is preferably implemented as a one-dimensional shift register whereby the image data, in the form of binary pixel values is passed into one end and shifted toward the other end in response to a pixel clock. Once stored in the buffer 70, the image data for the specified context window, as represented by the five-pixel context window 46 of FIG. 6, is selected via hardwire connections to represent the binary values of the target pixel or pixel of interest and neighboring pixels. In particular, lines 72 of FIG. 4 transfer the pixel values for the context window (five sets of lines, each representing a pixel in the context window) to a programmable logic array (PLA) 80. A 5-bit parallel "vector," including a one-bit center pixel signal (line 78), is passed to programmable logic array (PLA) 80, where the center pixel signal is passed through the device unaltered and the 5-bit context data is compared to templates logically represented therein to identify matches. In particular, if a template represented in the PLA, for example the template depicted in FIG. 3A, is matched the PLA will output on lines 82 a non-zero value indicating the number or code of the template that was matched. Otherwise, if there is no template match, the PLA outputs a zero code on the output lines 80. When a zero code is output, a "0" is passed from OR gate 86 to the select input of MUX 88 so as to enable the target pixel value (line 78) to pass directly to the pulse width position modulation (PWPM) driver 90 and on to the raster output scanner (ROS).

In response to a non-zero output on lines 82, OR gate 86 outputs a binary "1" to the MUX and the output of look-up table (LUT) 94 is utilized by PWPM driver 90 to control the ROS. Preferably, LUT 94 is a programmable look-up table wherein the n-bit input on lines 82 is utilized as an address to cause the output of the appropriate PWPM signal on line 96. LUT 94 is preferably a programmable device, capable of having the contents stored therein downloaded to the LUT in response to a user input.

Having described a general implementation of the present invention, the operation of a preferred multiple-bit per pixel embodiment will be described. Such an embodiment is particularly well suited for, and will be described with respect to, a printing system capable of rendering output in response to gray scale image data represented in the form of 2-bits per pixel. In particular, a multiple bit per pixel embodiment requires modification of the PLA logic structure as the PLA is not well suited to non-binary input. Specifically, for the reduced bit per pixel context (2-bit), the possible target pixel or pixel of interest in the context window could be one of two possible gray levels, white, or black. The appearance of a gray target pixel may trigger a template in the present invention because the grays are the only pixels selected for compact dot growth processing. On the other hand, a black or white target pixel requires no modification for compact dot growth.

Figure 5:
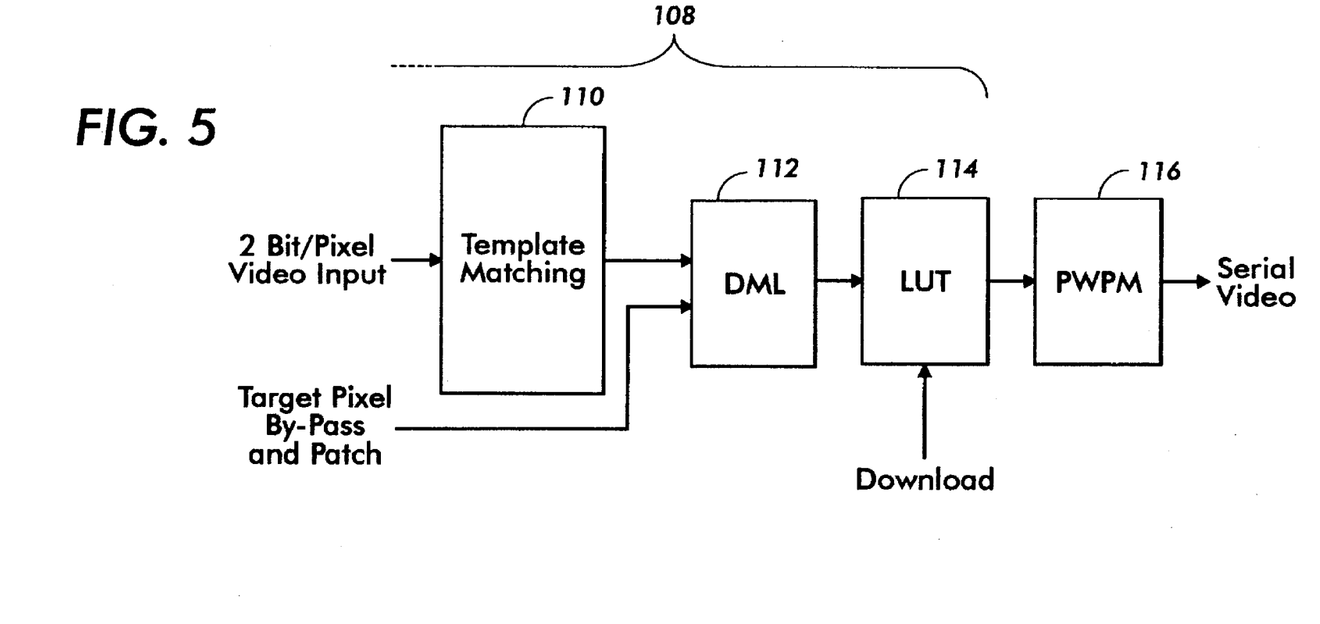
FIG. 5 is a data flow diagram of a multiple bit per pixel embodiment of a hardware system implementing the present invention.

In FIG. 5, there is illustrated a data flow diagram of the raster-to-video architecture employed in an embodiment of the 2-bit per pixel printing system. Although the architecture may be designed for a dual beam raster output scanning IOT there is no intent to limit the present invention to the same. Logically, the image processing section 108 of such a printing system receives digital image data from an image source (not shown), performs the required image processing functions, and passes serial analog video to the raster output scanning electronics, including the laser diode which images a photoconductor. More specifically, the incoming serial video stream at 2-bits per pixel is processed through a FIFO buffer, as previously described, to construct a one dimensional image data array or segment from which the pixel context associated with the template matching operation (block 110) is determined. Although not specifically described herein, it is taught by Parker (application Ser. No. 08/496,556) and Coonan et al. (application Ser. No. 08/496,654) that the video path may be split into two paths, one for each of the high and low order bits. The image processing operations for each path would be the same and are performed in parallel. The 1×5 image segment illustrated in FIG. 6, converted into a pair of 1×5 parallel vectors (one for each of two bits) at the FIFO, has two 1×5, one-dimensional patterns of five pixels ($P_1$–$P_5$) formed from the larger raster, and the resulting vector (high and low order bits) is input into the template matching block 110, preferably implemented as a gate array. The output from the template matching block 110 is a coded value (see col. 2 of Table A)that is sent via a digital multiplexing latch (DML) 112 to look-up table (LUT) 114 for interpretation. DML 112 functions as a latch that controls which signal (the output of template matching block 110 or the bypass) is passed to the LUT 114. During normal operation (the printing of a page), the bypass does not operate and all signals are relayed from the template matching block 110. For testing and calibration during an interdocument gap, signals from the bypass input may be used to expose test patches on the photoconductor. An output signal produced by LUT 114 contains both pixel position and pixel width information to be interpreted by the pulse-width position-modulation (PWPM) chip 116 to enable sub pixel modulation at the ROS. As an alternative, it will be appreciated that it may be possible to utilize the template matching block 110 to generate the PWPM code for direct output to PWPM chip 116.

Further details of the image processing architecture are described by Parker in U.S. patent application Ser. No. 08/496,556, incorporated by reference, where there is shown hardware components suitable for implementing a complementary template matching procedure to identify those pixels subject to the compact dot growth operations of the present invention. The architecture is preferably a 2-channel design embedded within an application specific integrated circuit (ASIC) as disclosed therein. In the implementation of the present invention, the input context consists of five pixels that are compared to templates implemented in a template matching gate array to identify matching patterns for the context pixels. Table A is an illustration of the templates employed to detect the presence of those context pixel patterns identified as requiring adjustment for improved compact dot growth in accordance with the present invention.

Having described examples and a hardware architecture for the improved compact dot growth technique of the present invention, the input pixel possibilities and resulting output code are summarized in TABLE A:

As described, the output code generated is then translated to generate a code for PWPM;. the effect of this code on the center (partial) pixel being listed under the "Result" column; where "SHIFT RIGHT" means to push the exposure pulse for the pixel to the right side of a pixel period, and "SHIFT LEFT" means to push the pulse to the left of the pixel period.

In recapitulation, the present invention is a method and apparatus for controlling the dot growth of bitmap images rendered on a printing system. The invention operates to recognize those gray level pixels within a bitmap image that are appropriate for alteration and altering the identified pixels so as to assure a more stable output thereof.

It is, therefore, apparent that there has been provided, in accordance with the present invention, a method and apparatus for implementing improved compact dot growth (CGD) in a printing system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

TABLE A

| Input Window | | | | | LUT Output | |
| $X_{-2}$ | $X_{-1}$ | $X_0$ | $X_1$ | $X_2$ | Code | Result |
| --- | --- | --- | --- | --- | --- | --- |
| — | W | G1 | G1 | W | 1 | SHIFT RIGHT |
| W | G1 | G1 | W | — | 2 | SHIFT LEFT |
| — | W | G1 | G2 | W | 1 | SHIFT RIGHT |
| W | G1 | G2 | W | — | 4 | SHIFT LEFT |
| — | W | G2 | G1 | W | 3 | SHIFT RIGHT |
| W | G2 | G1 | W | — | 2 | SHIFT LEFT |
| — | W | G2 | G2 | W | 3 | SHIFT RIGHT |
| W | G2 | G2 | W | — | 4 | SHIFT LEFT |
| — | B | G1 | G1 | B | 2 | SHIFT LEFT |
| B | G1 | G1 | B | — | 1 | SHIFT RIGHT |
| — | 8 | G1 | G2 | B | 2 | SHIFT LEFT |
| B | G1 | G2 | B | — | 3 | SHIFT RIGHT |
| — | B | G2 | G1 | B | 4 | SHIFT LEFT |
| B | G2 | G1 | B | — | 1 | SHIFT RIGHT |
| — | B | G2 | G2 | B | 4 | SHIFT LEFT |
| B | G2 | G2 | B | — | 3 | SHIFT RIGHT |

We claim:

1. A compact dot growth method for selectively controlling the exposure of a xerographic printing system capable of producing printed output from a print engine in response to a digital image, consisting of a plurality of digital image signals each digital image signal indicating one of a plurality gray exposure levels as a multi-bit value, comprising the steps of:

storing, in memory, a one-dimensional segment of the digital image signals forming the digital image;

identifying, using a template matching operation applied to the stored digital image signals, a multi-bit value associated with a pixel position to be selectively controlled;

for the pixel position identified to be selectively controlled, producing a pixel code representative of an exposure duration and position shift to be applied to the pixel position to be selectively controlled, and directing the print engine to shift the exposure position in response to the pixel code.

2. The method of claim 1, wherein the step of directing the print engine to shift the exposure position comprises the steps of:

transmitting the pixel code to a look-up table;

generating, using the look-up table, a pulse-width position-modulated output signal; and passing the pulse-width position-modulated output signal directly to the print engine to control the exposure of the pixel position within the xerographic printing system.

3. The method of claim 1, wherein the step of identifying pixel values associated with pixel positions to be selectively tuned comprises the steps of:

comparing the values of pixels within a one-dimensional context window against a plurality of templates;

providing a positive signal indicating the occurrence of a match between the values of pixels within the context window and one of the plurality of templates, otherwise providing no positive indication of a match.

4. The method of claim 3, wherein the one-dimensional context window is a five pixel wide window centered on the pixel position to be selectively controlled.

5. The method of claim 4, wherein the one-dimensional context window includes a multi-bit value representing a first gray level for the pixel position to be selectively controlled.

6. The method of claim 5, wherein the one-dimensional context window includes a multi-bit value representing a second gray level for a pixel position adjacent a first side of the pixel position to be selectively controlled.

7. The method of claim 6, wherein the second gray level is equivalent to the first gray level.

8. The method of claim 6, wherein the one-dimensional context window includes a multi-bit value representing a white level for a pixel position adjacent a second side of the pixel position to be selectively controlled.

9. The method of claim 6, wherein the one-dimensional context window includes a multi-bit value representing a black level for a pixel position adjacent a second side of the pixel position to be selectively controlled.

10. An image processing apparatus for processing a bitmap image consisting of a plurality of input image signals representing a bitmap image, comprising:

a one-dimensional context memory for storing a plurality of multi-bit image signals from a single raster of the bitmap;

a template matching circuit for comparing the multi-bit image signals stored in said one-dimensional context memory with a plurality of templates, said template matching circuit outputting a signal indicating a match between the stored image signals and a template; and a pixel code generator, responsive to said template matching circuit, for generating a pixel code in response to the signal indicating a match between the stored multi-bit image signals and the template, said pixel code indicating the exposure duration and shifted location within a pixel period for a target pixel within the context memory.

11. The apparatus of claim 10, further comprising a look-up table, responsive to the pixel code received from said pixel code generator, for generating a pulse width position modulated output signal that is supplied to a print engine to control the output thereof.

12. The method of claim 11, wherein the one-dimensional context memory includes a five pixel wide window centered about the target pixel.

13. A printing system for processing a bitmap image consisting of a plurality of gray input image signals at a first resolution to be represented as a binary bitmap image at a resolution greater than the first resolution, comprising:

a one-dimensional memory buffer for storing a portion of a single raster of the gray image signals at the first resolution;

pattern matching logic circuitry for identifying, within the stored gray image signals at the first resolution, a target pixel requiring modification prior to exposure of a binary pixel at a second resolution greater than the first resolution, said pattern matching logic circuitry producing a signal whenever the target pixel requiring modification is identified; and a programmable device, responsive to the signal generated by the pattern matching logic circuitry and the target pixel image signal, for producing an output signal for driving the printing system, the output signal resulting in the production, by the printing system, of a binary exposure pulse shifted within a pixel period defined by the first resolution.

14. The printing system of claim 13, wherein said pattern matching logic circuitry is a template matching circuit.

15. The printing system of claim 14, wherein said template matching circuit compares the image signals for the target pixel and a plurality of neighboring pixels within the same image raster to a predefined, one dimensional template pattern to determine a match therewith, and upon identifying such a match produces a signal indicative of the match.

16. The printing system of claim 15, wherein the plurality of neighboring pixels comprise a first pair of pixels in positions adjacent to the target pixel position within the bitmap image and at least one of a second pair of pixels in positions adjacent to the target pixel position within the bitmap image.

17. The printing system of claim 16, wherein at least one of the first pair of pixels in positions adjacent to the target pixel position within the bitmap image is characterized by a gray level between a maximum level and a minimum gray level.

18. The printing system of claim 13, wherein said printing system further includes a raster output scanning exposure system responsive to a pulse-width, position-modulated output signal generated by said programmable device.

19. The printing system of claim 13, wherein said pulse-width, position-modulated output signal includes:

a first signal portion representing the position of an exposure pulse within a pixel period; and a second signal portion representing the duration of the exposure pulse.

\* \* \* \* \*